United States Patent
Prasad et al.

(10) Patent No.: US 9,420,493 B2
(45) Date of Patent: Aug. 16, 2016

(54) EXPLOITING CELL DORMANCY AND LOAD BALANCING IN LTE HETNETS

(71) Applicant: NEC Laboratories America, Inc., Princeton, NJ (US)

(72) Inventors: Narayan Prasad, Wyncote, PA (US); Mustafa Arslan, Princeton, NJ (US); Sampath Rangarajan, Bridgewater, NJ (US)

(73) Assignee: NEC Corporation (JP)

( * ) Notice: Subject to any disclaimer, the term of this patent is extended or adjusted under 35 U.S.C. 154(b) by 125 days.

(21) Appl. No.: 14/499,219

(22) Filed: Sep. 28, 2014

(65) Prior Publication Data

US 2015/0092558 A1    Apr. 2, 2015

Related U.S. Application Data

(60) Provisional application No. 61/891,114, filed on Oct. 15, 2013, provisional application No. 61/883,551, filed on Sep. 27, 2013.

(51) Int. Cl.
     *H04J 1/16*      (2006.01)
     *H04W 28/08*      (2009.01)
     *H04W 84/04*      (2009.01)

(52) U.S. Cl.
     CPC ............ *H04W 28/08* (2013.01); *H04W 84/045* (2013.01)

(58) Field of Classification Search
     CPC ........................... H04W 28/08; H04W 84/045
     See application file for complete search history.

(56) References Cited

U.S. PATENT DOCUMENTS

| | | | | |
|---|---|---|---|---|
| 2008/0075033 A1* | 3/2008 | Shattil | .................... | H04B 7/026 370/328 |
| 2010/0254335 A1* | 10/2010 | Koo | ....................... | H04W 48/08 370/329 |
| 2012/0225662 A1* | 9/2012 | Jo | ...................... | H04W 72/0486 455/447 |
| 2013/0058307 A1* | 3/2013 | Kim | ....................... | H04B 7/024 370/329 |
| 2013/0196678 A1* | 8/2013 | Liu | ........................ | H04W 28/16 455/452.1 |

* cited by examiner

*Primary Examiner* — Ayaz Sheikh
*Assistant Examiner* — Hai-Chang Hsiung
(74) *Attorney, Agent, or Firm* — Joseph Kolodka

(57) ABSTRACT

At a coarse time-scale, at the start of each frame the choice of TPs to be made active and users to associate with the active TPs are determined by solving an optimization problem. The inputs to the optimization problem are averaged slowly varying metrics that are relevant for a period longer than the backhaul latency. At a the fine time-scale, in each slot each active TP independently does scheduling over the set of users associated with it, without any coordination with any of the other active TPs, based on fast changing information, such as instantaneous rate or SINR estimates.

18 Claims, 5 Drawing Sheets

EXPLOITING CELL DORMANCY AND LOAD BALANCING IN LTE HETNETS

RELATED APPLICATION INFORMATION

This application claims priority to both provisional application 61/883,551 filed Sep. 27, 2013 and provisional application 61/891,114 filed Oct. 15, 2013, the contents thereof being incorporated herein by reference

BACKGROUND OF THE INVENTION

The present invention relates generally to wireless communications, and more particularly, to exploiting cell dormancy and load balancing in long term evolution LTE heterogenous networks (HetNets).

Cellular wireless networks are morphing into dense hetergenous networks HetNets formed by a multitude of transmission points (TPs or nodes) ranging from the more conventional high power macro base-stations to low power pico nodes, all deployed in a highly irregular fashion. Realizing the full potential of these HetNets via intelligent resource management has become a major driver of both academic and industrial research. Resource management in HetNets is done over a coordination area comprising of a set of transmission points (TPs) and a set of users that those TPs should serve. The design of such resource management (or allocation) schemes commenced by assuming ideal conditions, such as availability of perfect and instantaneous channel state information (CSI) for all TP-user links in the coordination area. Instantaneous data sharing among the TPs was generally not assumed and most works adopted a pre-determined association of users to TPs over the time-scale of interest. However, the design of the resulting optimal resource allocation scheme was shown to be intractable in general. Consequently, research efforts were directed towards obtaining efficient and near-optimal scheme. Non-idealities in the CSI were also explicitly modeled and incorporated. In addition, methods that account for the overhead (corresponding to training and over-the-air and backhaul signaling) have been proposed and analyzed. A state-of-the-art scheme which accounts for several practical limitations is described in, wherein each user also aids the network via smart feedback.

Most existing works in this area consider either exploiting only cell dormancy for a given user association or exploiting only user association for a given set of active transmission nodes. Moreover, prior efforts do not realize that the user association problem is optimally solvable in an efficient manner.

The focus of this invention is on heterogeneous wireless networks (HetNets) that are expected to be fairly common and where the transmission points in the HetNet will be connected to each other by a non-ideal backhaul with a relatively high latency (ranging from 50 milliseconds to several dozens of milliseconds). Over such HetNets schemes that strive to obtain all coordinated resource management decisions within the fine slot-level granularity (typically a millisecond) are not suitable, since coordination (which involves exchange of messages and signaling over the backhaul) cannot be performed in such a fast manner

BRIEF SUMMARY OF THE INVENTION

The invention is directed to a computer implemented method for LTE heterogenous networks (HetNets), the method includes considering some transmission points (TPs) from a set of TPs of interest that are made inactive over a frame, and load balancing (known as user association), associating users to active TPs in the set of TPs such that each user is associated to any one active TP over the frame, reformulating the user association for any given set of active TPs in an LTE heterogenous network as coarse time-scale (frame-level granularity) and fine-time scale (fine sub-frame/slot level) approaches, performing periodically the coarse frame-level granularity based on averaged slowly varying metrics that are relevant for a period longer than a backhaul latency, and doing the fine sub-frame/slot level granularity with no coordination among TPs and independently by each active TP based on fast changing information.

In a similar aspect of the invention, there is provided a transitory storage medium configured with instructions for a computer to carry out considering some transmission points (TPs) from a set of TPs of interest that are made inactive over a frame, and load balancing (known as user association), associating users to active TPs in the set of TPs such that each user is associated to any one active TP over the frame, reformulating the user association for any given set of active TPs in an LTE heterogenous network as coarse time-scale (frame-level granularity) and fine-time scale (fine sub-frame/slot level) approaches, performing periodically the coarse frame-level granularity based on averaged slowly varying metrics that are relevant for a period longer than a backhaul latency, and doing the fine sub-frame/slot level granularity with no coordination among TPs and independently by each active TP based on fast changing information.

These and other advantages of the invention will be apparent to those of ordinary skill in the art by reference to the following detailed description and the accompanying drawings.

DETAILED DESCRIPTION

The present invention is focused on a semi-static resource management solution, where resource management over the set of TPs is performed at two time scales, are suitable since they are more robust towards backhaul latency.

The present invention considers on such semi-static resource management scheme and attempts to jointly exploit cell dormancy (a.k.a. cell ON-OFF), wherein some transmission points (TPs) from a set of interest are made inactive over a frame, and load balancing (a.k.a. user association), wherein users are associated to the active transmission points in that set, such that each user is associated to any one active TP over the frame. This scheme requires limited coordination among TPs in the coordination area which is possible under a non-ideal backhaul. The underlying coordination is performed periodically at a coarser frame-level granularity based on averaged (not instantaneous) slowly varying metrics that are relevant for a period longer than the backhaul latency. Examples of such metrics include estimates of average rates that the users can receive from those TPs under different configurations etc. On the other hand, the resource management that is done at a much finer sub-frame/slot level granularity involves no coordination among TPs and is done independently by each active TP based on fast changing information, such as instantaneous rate or SINR estimates, that is received directly by that TP from the users associated to it.

Together, cell dormancy and load balancing can mitigate the undesirable scenarios of TPs becoming overloaded due to too many users being associated with them and users being interference limited due to transmissions from too many interfering TPs. In this invention, we show that jointly exploiting these two features is indeed necessary to realize the full potential of practical HetNets in which the transmission points are connected by a practical non-ideal backhaul.

Figure 1:
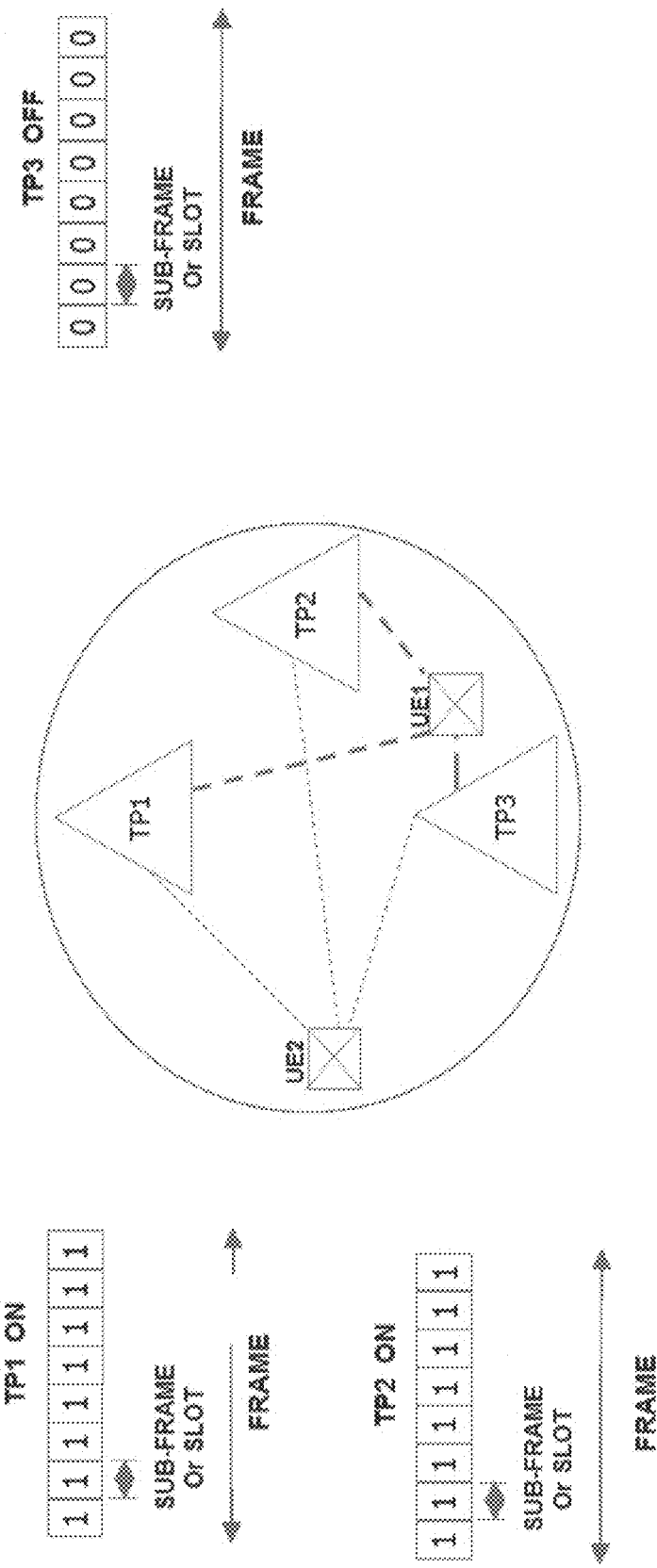
FIG. 1 is a diagram of an exemplary heterogenous network HetNet with 3 transmission points TPs and 2 users, in accordance with the invention.

FIG. 1 shows a diagram of a heterogenous network HetNet with 3 transmission points TPs and 2 users. Dashed lines indicate potential associations of a user to TPs. In this example, TP1 and TP2 are made active (i.e., set to be ON) over the frame, so each user must be associated to either TP1 or TP2 over that frame.

The present invention is directed to the load balancing (user-association) sub-problem for any given set of active transmission nodes can be re-formulated as an asymmetric assignment problem and hence can be optimally solved in an efficient manner. In addition, a low complexity greedy approach is proposed that offers a near-optimal performance and a certain worst-case performance guarantee. We then propose three low-complexity algorithms for the joint optimization problem, including one based on a successive approximation. Simulations over an example LTE HetNet topology reveal the superior performance of the proposed algorithms and underscore the benefits of jointly exploiting cell dormancy and load balancing. Further, we suggest a simple and intuitive way to incorporate an additional multi-user diversity gain term into the proportional fairness (PF) system utility, which also allows us to re-use all of the aforementioned algorithms. Finally, we describe a simple way to approximately realize a given input user association via biasing factors.

Figure 2:
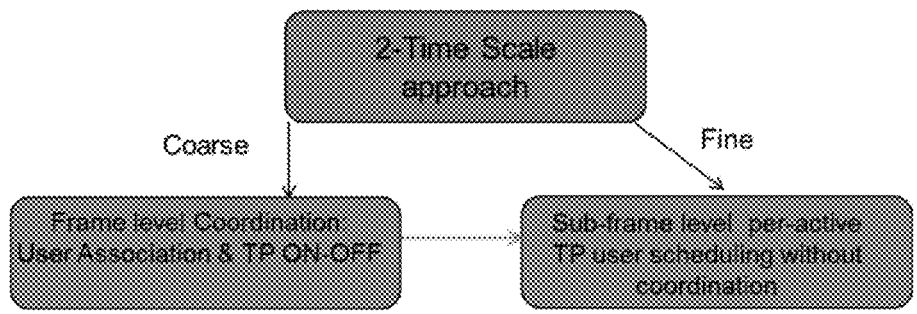
FIG. 2 is a diagram a of a two-time scale approach, in accordance with the invention.

FIG. 2 shows a diagram of the inventive two-time scale approach for a semi-static resource management solution, where resource management over the set of TPs is performed at two time scales, a coarse time scale and a fine time scale.

At a coarse time-scale, at the start of each frame the choice of which TPs to be made active and which users to associate with the active TPs are determined by solving an optimization problem. The inputs to the optimization problem are averaged (not instantaneous) slowly varying metrics that are relevant for a period longer than the backhaul latency. Examples of such metrics include estimates of average rates that the users can receive from those TPs under different configurations etc. At a the fine time-scale, in each slot each active TP independently does scheduling over the set of users associated with it, without any coordination with any of the other active TPs, based on fast changing information, such as instantaneous rate or SINR estimates, that is received directly by that TP from the users associated to it.

To solve the joint optimization problem, we first consider the user-association sub-problem and propose two processes.

We first introduce the user association sub-problem:

$$\max_{x_{u,b} \in \{0,1\} \forall u,b} \sum_{u \in \mathcal{U}} \sum_{b \in \mathcal{A}} x_{u,b} \ln\left(\frac{R_u^{(b)}(\mathcal{A})}{\sum_{k \in \mathcal{U}} x_{k,b}}\right)$$

$$\text{s.t.} \sum_{b \in \mathcal{A}} x_{u,b} = 1, \forall u \in \mathcal{U}; \sum_{u \in \mathcal{U}} x_{u,b} \leq N_b, \forall b \in \mathcal{A}.$$

In this optimization problem, the inputs are the average single-user rate of each user u when associated to each TP b, for each choice of active set. The inputs are an average rate of user u when associated to TP b in a given active set of TPs $\mathcal{A} \subseteq B: R_u^{(b)}(\mathcal{A})$, with a user limit TP b of $N_b$. The variables are an indicator variable for association of user u to TP b in active set $x_{u,b}$. The constraints are: associate each user with one active TP and do not exceed the user-limit for any TP. Note that in this optimization problem the rate obtained by any user from its assigned TP is modeled to be the corresponding single-user rate divided by the load, i.e., the total number of users assigned to the same TP.

Figure 3:
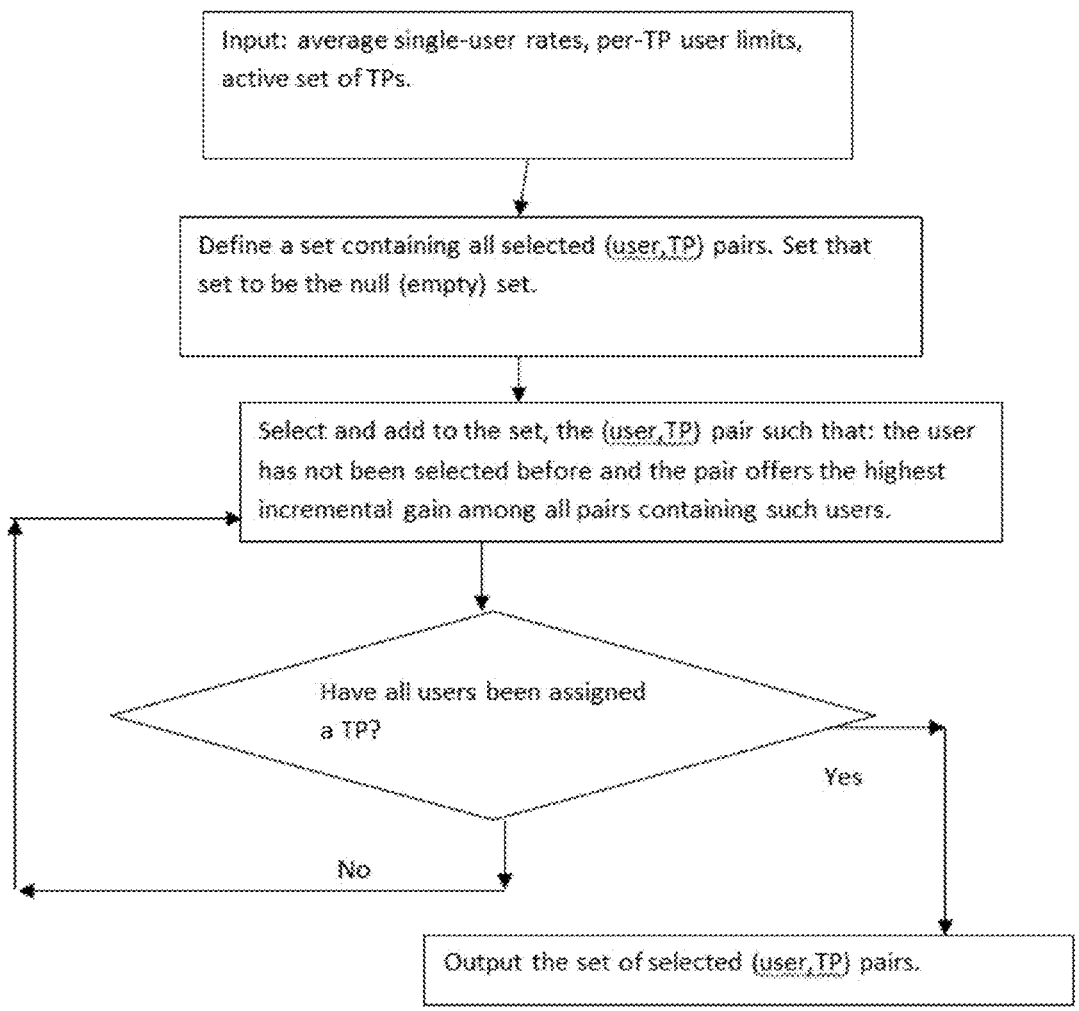
FIG. 3 is a diagram of a greedy user-association process, in accordance with the invention.

The flow diagram for a low complexity sub-optimal greedy user-association process is shown in FIG. 3. There is an input of average single-user rates, per-TP user limits, and active set of TPs. A set containing all selected (user,TP) pairs is define and the set is set to be the null (empty) set. Then the process selects and adds to the set, the (user,TP) pair such that: the user has not been selected before and the pair offers the highest incremental gain among all pairs containing such users. If all users have been assigned a TP then the process outputs the set of selected (user,TP) pairs. Otherwise, the process returns to selecting and adding to the set, the (user, TP) pair such that: the user has not been selected before and the pair offers the highest incremental gain among all pairs containing such users.

Next, we can show that the user association problem can be re-formulated as the following equivalent asymmetric assignment problem. First, we define $N_b$ virtual TPs for each TP b with gains:

$$\omega_{u,b}^{(1)}(\Gamma) = \omega_{u,b} \ \& \ \omega_{u,b}^{(q)} = \omega_{u,b} - q\ln(q) + (q-1)\ln(q-1),$$

$$\forall q = 2, \ldots, N_b, \forall u \in \mathcal{U}, b \in \mathcal{A}.$$

$$\omega_{u,b} = \ln(R_u^{(b)}(A))$$

$$\max_{x_{u,b}^{(q)} \in \{0,1\} \forall u,b,q} \sum_{u \in \mathcal{U}} \sum_{b \in \mathcal{A}} \sum_{q=1}^{N_b} x_{u,b}^{(q)} \omega_{u,b}^{(q)}$$

$$\text{s.t.} \sum_{b \in \mathcal{A}} \sum_{q=1}^{N_b} x_{u,b}^{(q)} = 1 \ \forall u \in \mathcal{U}; \sum_{u \in \mathcal{U}} x_{u,b}^{(q)} \leq 1 \ \forall q = 1, \ldots, N_b, b \in \mathcal{A}.$$

Figure 4:
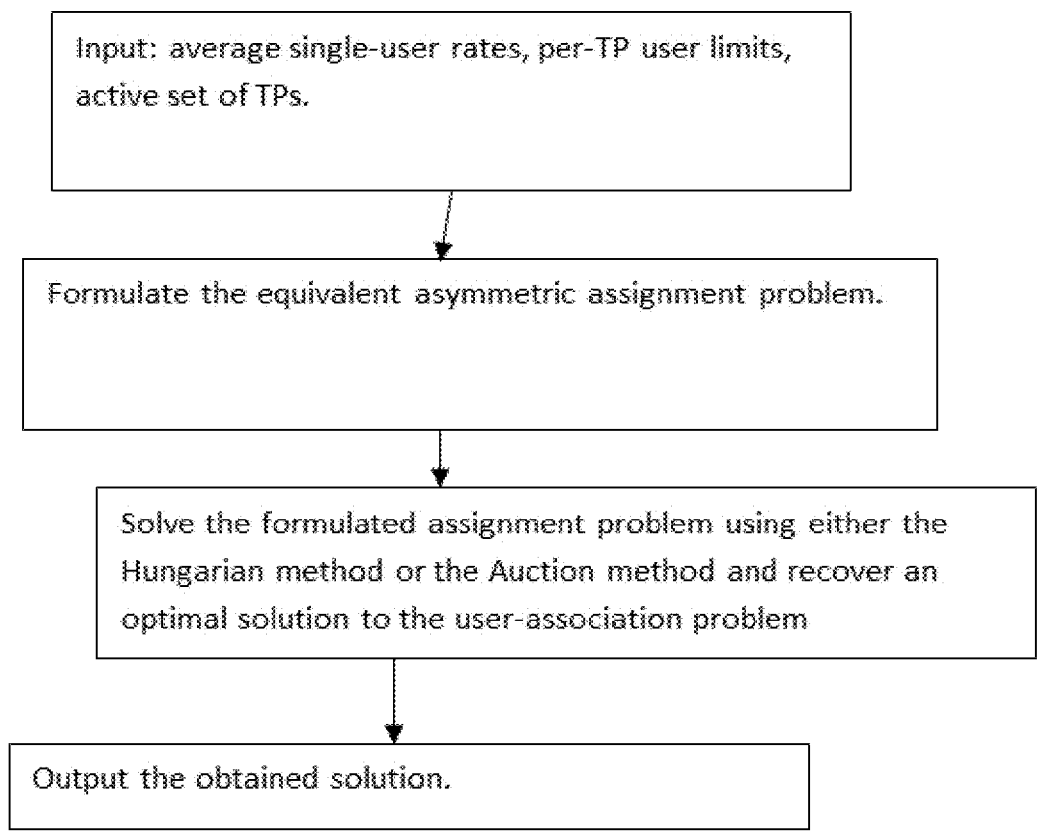
FIG. 4 is a diagram of an optimal user-association process, in accordance with the invention.

Referring to the flow diagram of FIG. 4 for an optimal user-association process, the input includes average single-user rates, per-TP user limits, and active set of TPs. The process formulates the equivalent asymmetric assignment problem. Then the process solves the formulated assignment problem using either the Hungarian method or the Auction method and recovers an optimal solution to the user-association problem. The obtained solution is output.

Now the joint on-off and user association problem can be formulated:

$$\max_{\mathcal{A}\subseteq B}\left\{\max_{x_{u,b}\in[0,1]\forall u,b}\left\{\sum_{u\in\mathcal{U}}\sum_{b\in\mathcal{A}}x_{u,b}\ln\left(\frac{R_u^{(b)}(\mathcal{A})}{\sum_{k\in\mathcal{U}}x_{k,b}}\right)\right\}\right\}$$

$$\text{s.t.}\sum_{b\in\mathcal{A}}x_{u,b}=1,\ \forall u\in\mathcal{U},$$

$$\sum_{u\in\mathcal{U}}x_{u,b}\leq N_b,\ \forall b\in\mathcal{A},$$

Where inputs include an average single user rate of user u when connected to TP b in any active set of TPs $\mathcal{A}\subseteq B:R_u^{(b)}(\mathcal{A})$, with a user limit TP b of $N_b$. The variables are a candidate set of active (on) TPs $\mathcal{A}\subseteq B$, and an indicator variable for connection of user u to TP b in active set $x_{u,b}$. The constraints are as before, where each user is associated with one active TP and the user limit for any TP is not exceeded.

Figure 5:
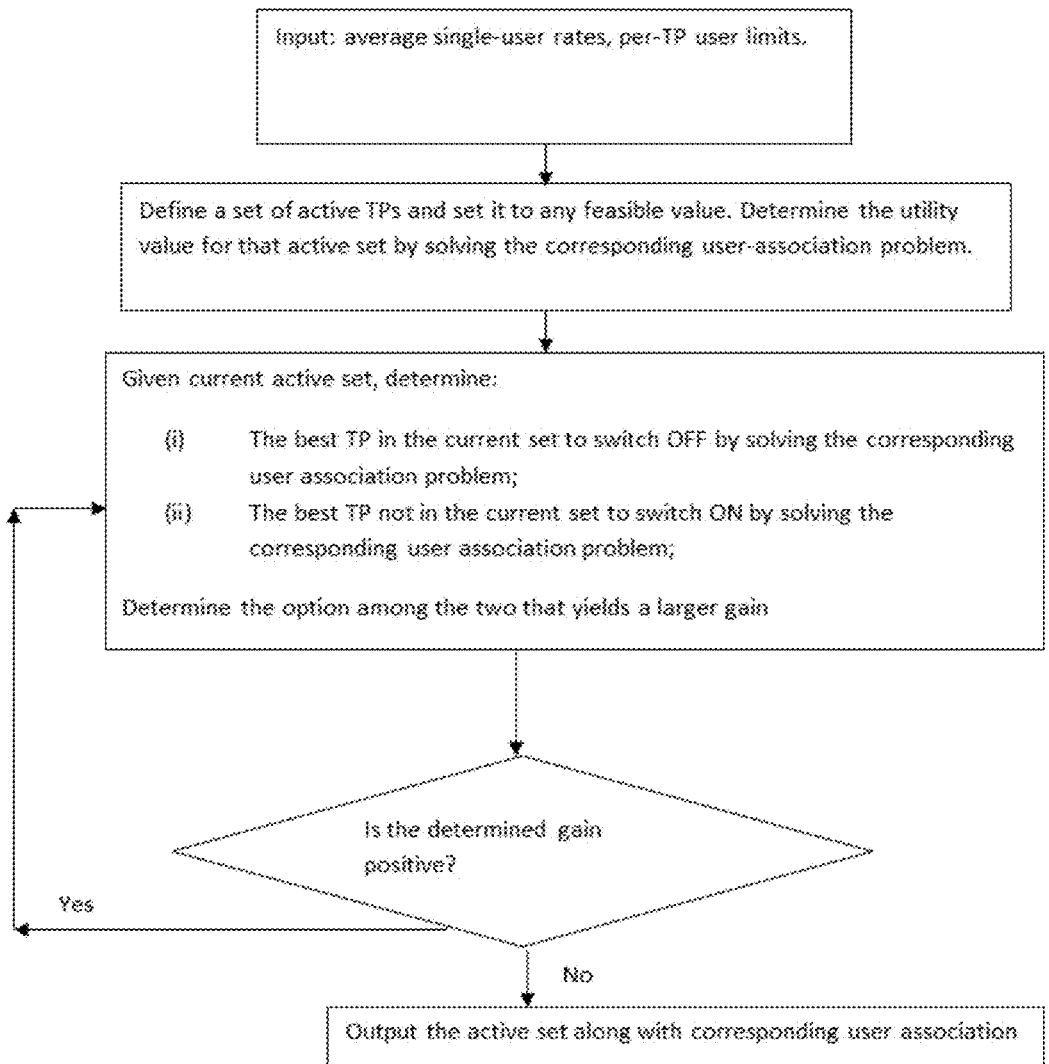
FIG. 5 is a diagram of a joint on-off and user association process, in accordance with the invention.

For this joint optimization problem we propose three processes, one of which is given below. Note that in the steps of FIG. 5, the user-association problem can either be solved using the greedy user-association process or the optimal user-association process.

Referring to FIG. 5 again, responsive to an input of average single-user rates, per-TP user limits, defining a set of active TP which is set to any feasible value, determining a utility value for that active set by solving the corresponding user association problem, given a current active set, there is a determination: (i) The best TP in the current set to switch OFF by solving the corresponding user association problem; (ii) The best TP not in the current set to switch ON by solving the corresponding user association problem; and then a determination of the option among the two that yields a larger gain. If the determined gain is positive the process returns to the given active set to determine (i) and (ii) again. Otherwise, the process outputs the active set along with the corresponding user association.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device. More details are discussed in U.S. Pat. No. 8,380,557, the content of which is incorporated by reference.

Figure 6:
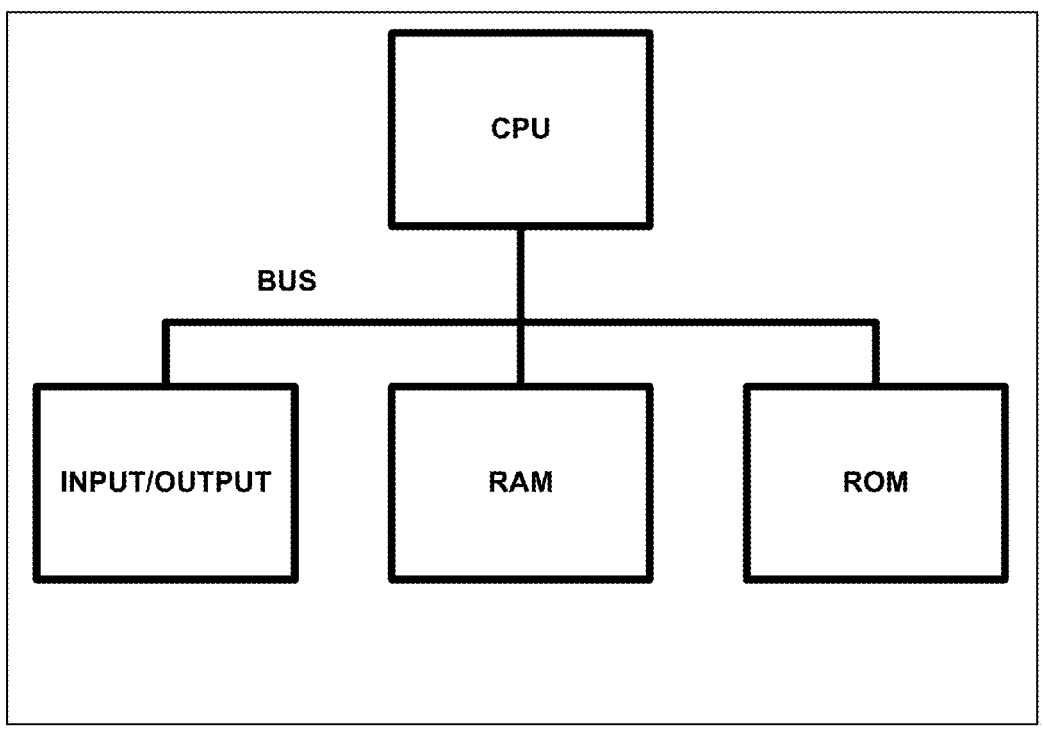
FIG. 6 shows an exemplary computer to perform the inventive database cloud bursting.

By way of example, a block diagram of a computer to support the system is discussed next in FIG. 6. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A computer implemented method for LTE heterogenous networks (HetNets), the method comprising:
    considering some transmission points (TPs) from a set of TPs of interest that are made inactive over a frame, and load balancing (known as user association),
    associating users to active TPs in the set of TPs such that each user is associated to any one active TP over the frame;
    reformulating the user association for any given set of active TPs in an LTE heterogenous network as coarse time-scale (frame-level granularity) and fine-time scale (fine sub-frame/slot level) approaches;
    performing periodically the coarse frame-level granularity based on averaged slowly varying metrics that are relevant for a period longer than a backhaul latency; and
    doing the fine sub-frame/slot level granularity with no coordination among TPs and independently by each active TP based on fast changing information; and
    determining joint on-off and user association as $$\max_{\mathcal{A}\subseteq B}\left\{\max_{x_{u,b}\in[0,1]\forall u,b}\left\{\sum_{u\in\mathcal{U}}\sum_{b\in\mathcal{A}}x_{u,b}\ln\left(\frac{R_u^{(b)}(\mathcal{A})}{\sum_{k\in\mathcal{U}}x_{k,b}}\right)\right\}\right\}$$

$$\text{s.t.}\sum_{b\in\mathcal{A}}x_{u,b}=1,\ \forall u\in\mathcal{U},$$

$$\sum_{u\in\mathcal{U}}x_{u,b}\leq N_b,\ \forall b\in\mathcal{A},$$

where inputs include an average single user rate of user u when connected to TP b in any active set of TPs $\mathcal{A}\subseteq B:R_u^{(b)}(\mathcal{A})$, with a user limit TP b of $N_b$, and variables are a candidate set of active (on) TPs $\mathcal{A}\subseteq B$, and an indicator variable for connection of user u to TP b in active set $x_{u,b}$; and reformulating the user association by selecting and adding to a (user,TP) pair such that the user has not been selected before and the pair offers a highest incremental gain among all pairs containing such users with responsive to an input of average single-user rates, per-TP user limits, and active set of TPs.

2. The method of claim 1, wherein the metrics include estimates of average rates that the users can receive from the TPs under different configurations.

3. The method of claim 1, wherein the fast changing information includes instantaneous rate or signal-noise-ratio SINK estimates that is received directly by the TP from the users associated to it.

4. The method of claim 1, wherein the coarse time-scale granularity includes, at the start of each frame, the choice of which TPs are to be made active and which users to associate with the active TPs which is determined by solving an optimization problem.

5. The method of claim 4, wherein inputs to the optimization problem are averaged, not instantaneous, slowly varying metrics that are relevant for a period longer than a backhaul latency.

6. The method of claim 1, wherein the fine time-scale granularity includes, in each slot, each active TP independently being scheduled over the set of users associated with it, without any coordination with any of the other active TPs, based on fast changing information.

7. The method of claim 1, wherein reformulating the user association includes solving a formulated assignment problem using either a Hungarian method or an auction method and recovering an optimal solution to a user-association problem responsive to average single-user rates, per-TP user limits, or active set of TPs.

8. The method of claim 1, wherein reformulating the user association includes determining a best TP in a current set to switch OFF by solving a corresponding user association with best TP not in the current set being switched ON by solving the corresponding user association problem and determining which yields a larger gain responsive to an input of average single-user rates and per-TP user limits.

9. The method of claim 8, wherein determining the best TP includes define a set of active TPs and setting it to any feasible value and determining utility value for that active set by solving corresponding user-association problem.

10. A non-transitory storage medium configured with instructions for a computer to carry out:
  considering some transmission points (TPs) from a set of TPs of interest that are made inactive over a frame, and load balancing (known as user association),
  associating users to active TPs in the set of TPs such that each user is associated to any one active TP over the frame;
  reformulating the user association for any given set of active TPs in an LTE heterogenous network as coarse time-scale (frame-level granularity) and fine-time scale (fine sub-frame/slot level) approaches;
  performing periodically the coarse frame-level granularity based on averaged slowly varying metrics that are relevant for a period longer than a backhaul latency; and
  doing the fine sub-frame/slot level granularity with no coordination among TPs and independently by each active TP based on fast changing information; and determining joint on-off and user association as $$\max_{\mathcal{A} \subseteq B} \left\{ \max_{x_{u,b} \in [0,1] \forall u,b} \left\{ \sum_{u \in \mathcal{U}} \sum_{b \in \mathcal{A}} x_{u,b} \ln\left( \frac{R_u^{(b)}(\mathcal{A})}{\sum_{k \in \mathcal{U}} x_{k,b}} \right) \right\} \right\}$$

$$\text{s.t.} \sum_{b \in \mathcal{A}} x_{u,b} = 1, \forall u \in \mathcal{U},$$

$$\sum_{u \in \mathcal{U}} x_{u,b} \leq N_b, \forall b \in \mathcal{A},$$

where inputs include an average single user rate of user u when connected to TP b in any active set of TPs $\mathcal{A} \subseteq B : R_u^{(b)}(\mathcal{A})$, with a user limit TP b of $N_b$, and variables are a candidate set of active (on) TPs $\mathcal{A} \subseteq B$, and an indicator variable for connection of user u to TP b in active set $x_{u,b}$; and
reformulating the user association by selecting and adding to a (user,TP) pair such that the user has not been selected before and the pair offers a highest incremental gain among all pairs containing such users with responsive to an input of average single-user rates, per-TP user limits, and active set of TPs.

11. The storage medium of claim 10, wherein the metrics include estimates of average rates that the users can receive from the TPs under different configurations.

12. The storage medium of claim 10, wherein the fast changing information includes instantaneous rate or signal-noise-ratio SINR estimates that is received directly by the TP from the users associated to it.

13. The storage medium of claim 10, wherein the coarse time-scale granularity includes, at the start of each frame, the choice of which TPs are to be made active and which users to associate with the active TPs which is determined by solving an optimization problem.

14. The storage medium of claim 13, wherein inputs to the optimization problem are averaged, not instantaneous, slowly varying metrics that are relevant for a period longer than a backhaul latency.

15. The storage medium of claim 10, wherein the fine time-scale granularity includes, in each slot, each active TP independently being scheduled over the set of users associated with it, without any coordination with any of the other active TPs, based on fast changing information.

16. The storage medium of claim 10, wherein the step of reformulating the user association includes solving a formulated assignment problem using either a Hungarian method or an auction method and recovering an optimal solution to a user-association problem responsive to average single-user rates, per-TP user limits, or active set of TPs.

17. The storage medium of claim 11, wherein the step of reformulating the user association includes determining a best TP in a current set to switch OFF by solving a corresponding user association with best TP not in the current set being switched ON by solving the corresponding user association problem and determining which yields a larger gain responsive to an input of average single-user rates and per-TP user limits.

18. The storage medium of claim 17, wherein determining the best TP includes define a set of active TPs and setting it to any feasible value and determining the utility value for that active set by solving corresponding user-association problem.

* * * * *